(12) United States Patent
Ellmore et al.

(10) Patent No.: US 12,046,422 B2
(45) Date of Patent: Jul. 23, 2024

(54) MULTILAYER ELECTRICAL COMPONENT

(71) Applicant: Knowles (UK) Ltd., Norwich (GB)

(72) Inventors: Angela Ellmore, Norwich (GB); Stephen Thomas Hopwood, Norwich (GB); Simon Grant, Norwich (GB)

(73) Assignee: Knowles (UK) Ltd., Norwich (GB)

( * ) Notice: Subject to any disclaimer, the term of this patent is extended or adjusted under 35 U.S.C. 154(b) by 162 days.

(21) Appl. No.: 17/734,509

(22) Filed: May 2, 2022

(65) Prior Publication Data

US 2023/0352241 A1 Nov. 2, 2023

(51) Int. Cl.
*H01G 4/30* (2006.01)
*H01G 4/012* (2006.01)
*H01G 4/38* (2006.01)

(52) U.S. Cl.
CPC ............ *H01G 4/30* (2013.01); *H01G 4/012* (2013.01); *H01G 4/385* (2013.01)

(58) Field of Classification Search
CPC ............ H01G 4/30; H01G 4/012; H01G 4/08; H01G 4/12; H01G 4/385
See application file for complete search history.

(56) References Cited

U.S. PATENT DOCUMENTS

| | | |
|---|---|---|
| 6,512,666 B1 | 1/2003 | Duva |
| 10,304,625 B2 | 5/2019 | Ellmore et al. |
| 2006/0279903 A1* | 12/2006 | Togashi .................. H01G 4/232 361/303 |
| 2014/0293500 A1* | 10/2014 | Seo .......................... H01G 4/12 29/25.42 |
| 2015/0170842 A1* | 6/2015 | An .......................... H01G 4/012 361/321.2 |
| 2015/0325371 A1* | 11/2015 | Hattori ..................... H01G 4/30 361/301.4 |
| 2017/0162335 A1* | 6/2017 | Ritter ..................... H01G 4/232 |
| 2019/0148068 A1* | 5/2019 | Lee ......................... H01G 4/385 361/301.4 |
| 2019/0148073 A1* | 5/2019 | Lee ......................... H01G 4/008 361/306.3 |
| 2019/0385796 A1 | 12/2019 | Hopwood et al. |
| 2022/0020532 A1 | 1/2022 | Ellmore et al. |

OTHER PUBLICATIONS

UK Search Report for GB2305798.7, Knowles (UK) Ltd., Waldie, Joanna,—date of search Oct. 16, 2023, mailing date Oct. 17, 2023.

* cited by examiner

*Primary Examiner* — Michael P McFadden
(74) *Attorney, Agent, or Firm* — Loppnow & Chapa (57) ABSTRACT

A multilayer electrical component including a plurality of parallel plate electrodes embedded in a dielectric body between first and second conductive terminations is disclosed. The dielectric body and the plurality of parallel plate electrodes form a plurality of capacitive layers each comprising a series of capacitors between the first and second conductive terminations. Each capacitor of the capacitive layers is partly defined by a gap in one of the parallel plate electrodes, wherein a gap of the one capacitive layer is laterally offset relative to a gap of an adjacent capacitive layer and a total capacitance of the adjacent capacitive layers is equivalent.

16 Claims, 4 Drawing Sheets

(Prior Art)

MULTILAYER ELECTRICAL COMPONENT

FIELD OF THE DISCLOSURE

The present disclosure relates generally to multilayer electrical components, like capacitors and varistors, having improved robustness and performance.

BACKGROUND

Multilayer ceramic capacitors (MLCCs) generally comprise multiple parallel plate electrodes, also referred to herein as "electrodes", embedded in a ceramic dielectric body. Portions of the dielectric body separate adjacent electrodes connected to opposite polarity conductive terminations capping end portions of the dielectric body. MLCC capacitors can be surface mounted on a printed circuit board using reflow soldering or other surface mounting technology for use in various applications, including high voltage and high frequency applications, among others.

Figure 1:
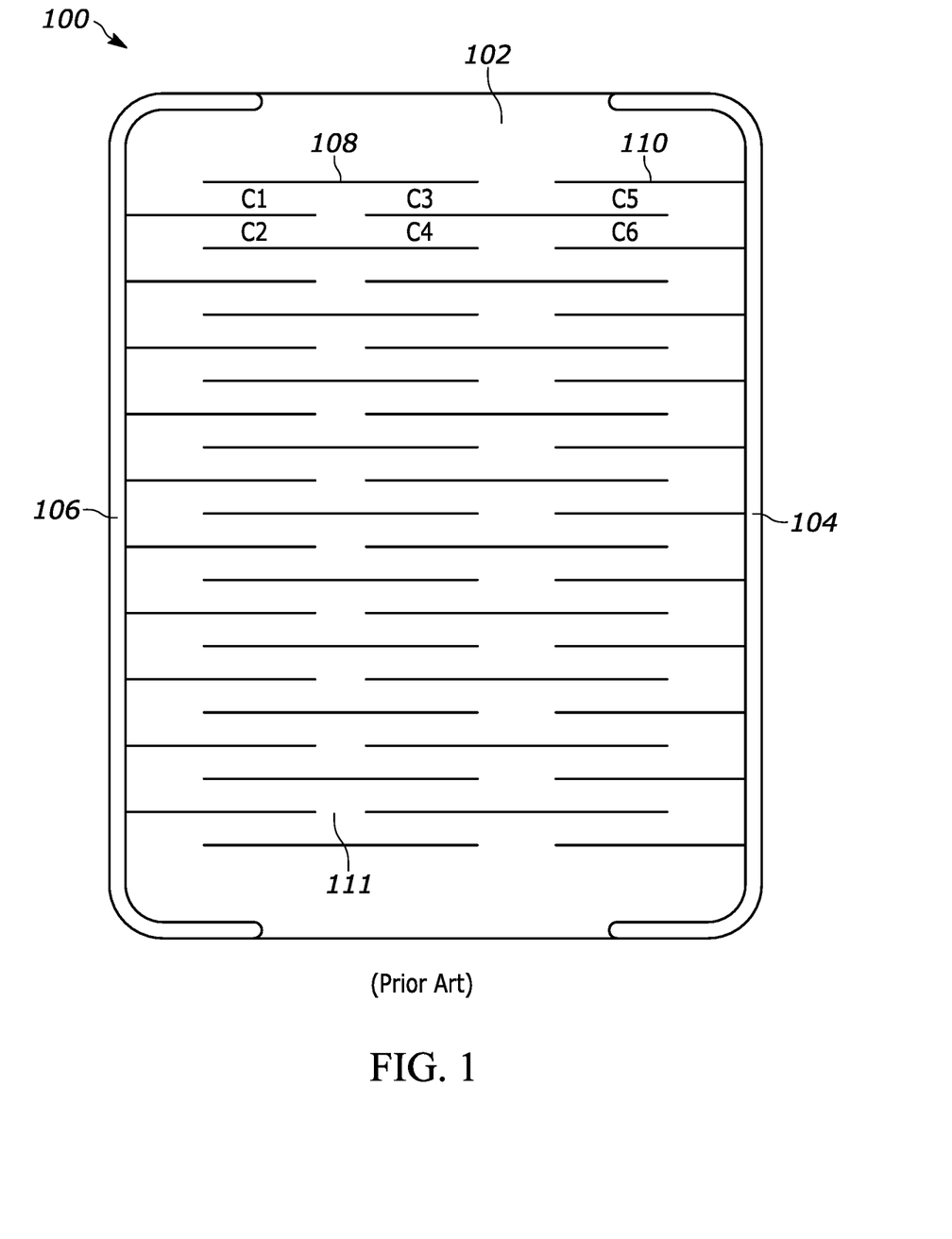
FIG. 1 is a schematic sectional view of a prior art multilayer ceramic capacitor.

Prior art FIG. 1 illustrates an MLCC 100 comprising multiple parallel plate electrodes embedded in a dielectric body 102 capped by conductive terminations 104, 106. Each electrode comprises multiple electrically isolated plate portions 108, 110 located in a common plane. An endmost plate of odd number electrodes is connected to the termination 104, and an endmost plate of even numbered electrodes is connected to the other termination 106. Overlapping plate portions of adjacent electrodes form a series arrangement of capacitors (e.g., $C_1$, $C_3$ and $C_5$) between the terminations in parallel with another series arrangement of capacitors (e.g., $C_2$, $C_4$ and $C_6$) between the terminations. Each series capacitor drops a portion of the voltage applied across the conductive terminations. However, these and other MLCCs are susceptible to stress fractures due to piezoelectric or electrostrictive forces along common boundaries between adjacent series capacitors (e.g., boundaries between capacitors $C_1$, $C_3$ and $C_5$ aligned with boundaries between capacitors $C_2$, $C_4$ and $C_6$), the boundaries being associated with gaps 111 separating the plate portions in a common plane. The occurrence of stress fractures is aggravated in applications where the MLCC is subject to higher voltages and higher frequencies. Thus, there is a desire to provide multilayer capacitors having improved robustness and performance.

BRIEF DESCRIPTION OF THE DRAWINGS

The objects, features and advantages of the present disclosure will become more fully apparent from the following detailed description and the appended claims considered in conjunction with the accompanying drawings. The drawings depict only representative embodiments and are therefore not considered to limit the scope of the disclosure.

Those of ordinary skill in the art will appreciate that the figures are illustrated for simplicity and clarity and therefore may not be drawn to scale and may not include well-known features, that the order of occurrence of actions or steps may be different than the order described or the steps or actions may be performed concurrently unless specified otherwise, and that the terms and expressions used herein have the meaning understood by those of ordinary skill in the art except where different meanings are attributed to them herein.

DETAILED DESCRIPTION

The disclosure relates generally to multilayer electrical components, like capacitors and varistors among other components, having improved robustness and performance. The multilayer electrical component generally comprises a dielectric body separating conductive terminations coupled to multiple parallel plate electrodes embedded in the dielectric body. Representative implementations are described further herein.

The composition of the dielectric material is typically selected based on operating temperature range, temperature stability, energy density, loss factor and relative permittivity, among other requirements or specifications of the multilayer electrical component. Suitable dielectric materials include ceramics and porcelains among other known and future materials. A representative ceramic comprises barium titanate and additives like glass and rare earth materials. Another representative ceramic comprises bismuth ferrite, strontium titanate and additives like barium titanate among other elements and compounds. Other representative ceramics can comprise magnesium titanate, neodymium titanate, strontium titanate, or calcium zirconate, among other compounds. Ceramics are currently favored for their ability to be formed by sintering a compositional powder during manufacture of the electrical component.

The electrodes can be formed of a precious or base metal. The conductive terminations can be implemented as caps formed on opposite sides or end portions of the dielectric body. The terminations can also comprise a base or precious metal. Representative examples include electroplated silver, copper, palladium/silver, among other metals and alloys. The terminations can also comprise metals and non-metal materials compositions. The multilayer electrical component (e.g., capacitor, varistor . . . ) can be configured for surface mounting with or without leads for through-hole mounting or for some other known or future mounting technology.

According to one aspect of the disclosure, a multilayer electrical component comprises first and second conductive terminations separated by a dielectric body and a plurality of parallel plate electrodes embedded in the dielectric body. The dielectric body and the plurality of parallel plate electrodes form multiple capacitive layers each comprising a series of capacitors between the first and second conductive terminations. Individual capacitors of the capacitive layers are at least partly defined by a gap in one of the electrodes, wherein a gap of at least one capacitive layer is laterally offset relative to a gap of an adjacent capacitive layer. The lateral offset of the gaps distributes electrostrictive and piezoelectric forces that can stress the multilayer electrical component thereby reducing likelihood of failure. Thus configured, the multilayer electrical component is also capable of operating under higher applied voltages without breakdown.

In another implementation, the dielectric body and the plurality of parallel plate electrodes form a plurality of capacitive layers arranged in parallel between first and second conductive terminations. Each capacitive layer comprises a corresponding series of capacitors between the first and second conductive terminations. One or more capacitors in at least one capacitive layer have different capacitive values than adjacent capacitors in an adjacent capacitive layer. A total capacitance of each of the capacitive layers is equivalent. However, in some implementations, a lowermost or uppermost capacitive layer may have a different total capacitance than the other capacitive layers to prevent or reduce surface flashover. The adjacent capacitive layers having different adjacent capacitances distributes electrostrictive and piezoelectric forces that can stress the multilayer electrical component thereby reducing likelihood of failure. Thus configured, the multilayer electrical component is also capable of operating under higher applied voltages without breakdown.

Figure 2:
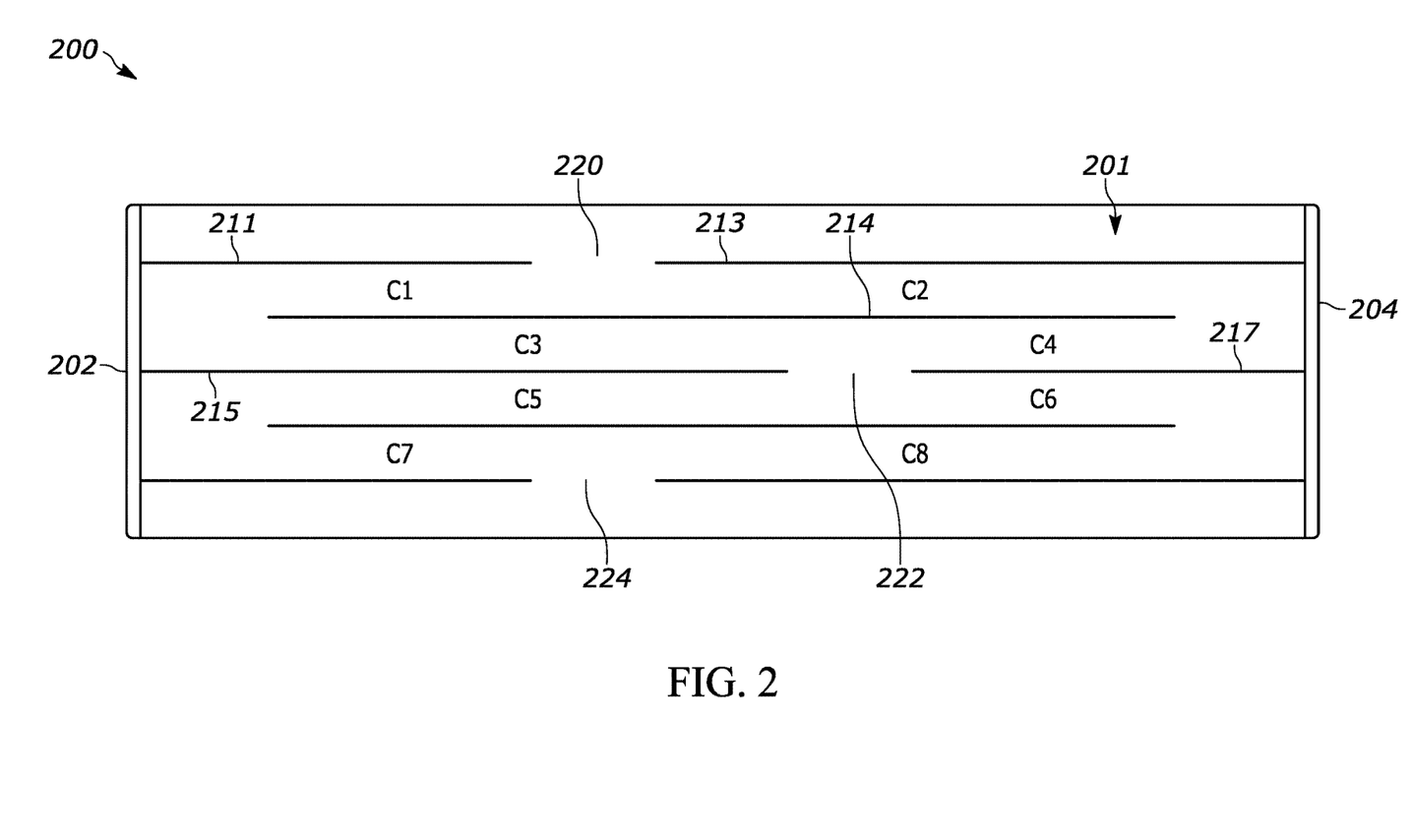
FIG. 2 is a schematic sectional view of a multilayer electrical component comprising multiple capacitive layers each having two series capacitors.

In FIG. 2, a multilayer electrical component 200 comprises a plurality of electrodes embedded in a dielectric body 201 forming a plurality of capacitive layers. A first capacitive layer comprises a first series of capacitors $C_1$ and $C_2$, a second capacitive layer comprises a second series of capacitors $C_3$ and $C_4$, a third capacitive layer comprises a third series of capacitors $C_5$ and $C_6$, and a fourth capacitive layer comprises a fourth series of capacitors $C_7$ and $C_8$. More generally, the multilayer electrical component can comprise more or less capacitive layers. The capacitive layers are all arranged in parallel between conductive terminations 202 and 204. In the first and second adjacent capacitive layers, adjacent capacitors $C_1$ and $C_3$ have different capacitive values and adjacent capacitors $C_2$ and $C_4$ have different values. Similarly, in the third and fourth adjacent capacitive layers, adjacent capacitors $C_5$ and $C_7$ have different capacitive values and adjacent capacitors $C_6$ and $C_8$ have different values. However, the total capacitance of the capacitive layers are equivalent (e.g., $C_1+C_2=C_3+C_4$ ... ). Adjacent capacitors of some adjacent capacitive layers can have the same value. In FIG. 2, for example, adjacent capacitors $C_3$ and $C_5$ have the same values and capacitors $C_4$ and $C_6$ have the same values. Also, as noted above in some implementations the lowermost and uppermost capacitive layers may have different total capacitances than the other capacitive layers to prevent or reduce surface flashover.

In FIG. 2, capacitors $C_1$ and $C_4$ have the same value and capacitors $C_2$ and $C_3$ have the same value, but the orders of arrangement of these common valued capacitors in the respective series between the terminations 202, 204 are reversed. More generally, however, the individual series capacitors of adjacent capacitive layers can have different values, provided that the total capacitances of the capacitive layers are equivalent. Additionally, the order of arrangement of the capacitors in the series can be mixed, rather than reversed, provided that at least some adjacent capacitors of adjacent capacitive layers have different capacitive values. The individual series capacitors in each capacitive layer are separated by a corresponding gap. At least some of the gaps in adjacent capacitive layers are laterally offset due to the different capacitive values or the different arrangement of individual capacitors in the adjacent capacitive layers.

In FIG. 2, the first capacitive layer comprises a first parallel plate electrode separated from a second parallel plate electrode by a portion of the dielectric body. The first parallel plate electrode comprises two electrically isolated plate portions 211, 213 and the second parallel plate electrode comprising a floating plate portion 214. The floating plate portion 214 overlaps the two plate portions 211, 213 and the overlapping plate portions form the first series of capacitors $C_1$ and $C_2$. Similarly, the second capacitive layer comprises the second parallel plate electrode separated from a third parallel plate electrode by a portion of the dielectric body. The third parallel plate electrode comprises two electrically isolated plate portions 215, 217. The floating plate portion 214 overlaps the two plate portions 215, 217 of the third parallel plate electrode and the overlapping plate portions form the second series of capacitors $C_3$ and $C_4$. A gap 220 separating the two plate portions 211, 213 of the first parallel plate electrode is laterally offset relative to a gap 222 separating the two plate portions 215, 217 of the third parallel plate electrode. Laterally offsetting the gaps between series capacitors of adjacent capacitive layers distributes the electrostrictive and piezoelectric forces over a larger volume of the multilayer electrical component thereby creating a more robust component less likely to fail and capable of operating under higher voltages and frequencies. In FIG. 2, a gap 224 between series capacitors $C_7$ and $C_8$ is aligned with the gap 220 between series capacitors $C_1$ and $C_2$, but in other implementations gaps 220 and 224 can also be offset.

Figure 3:
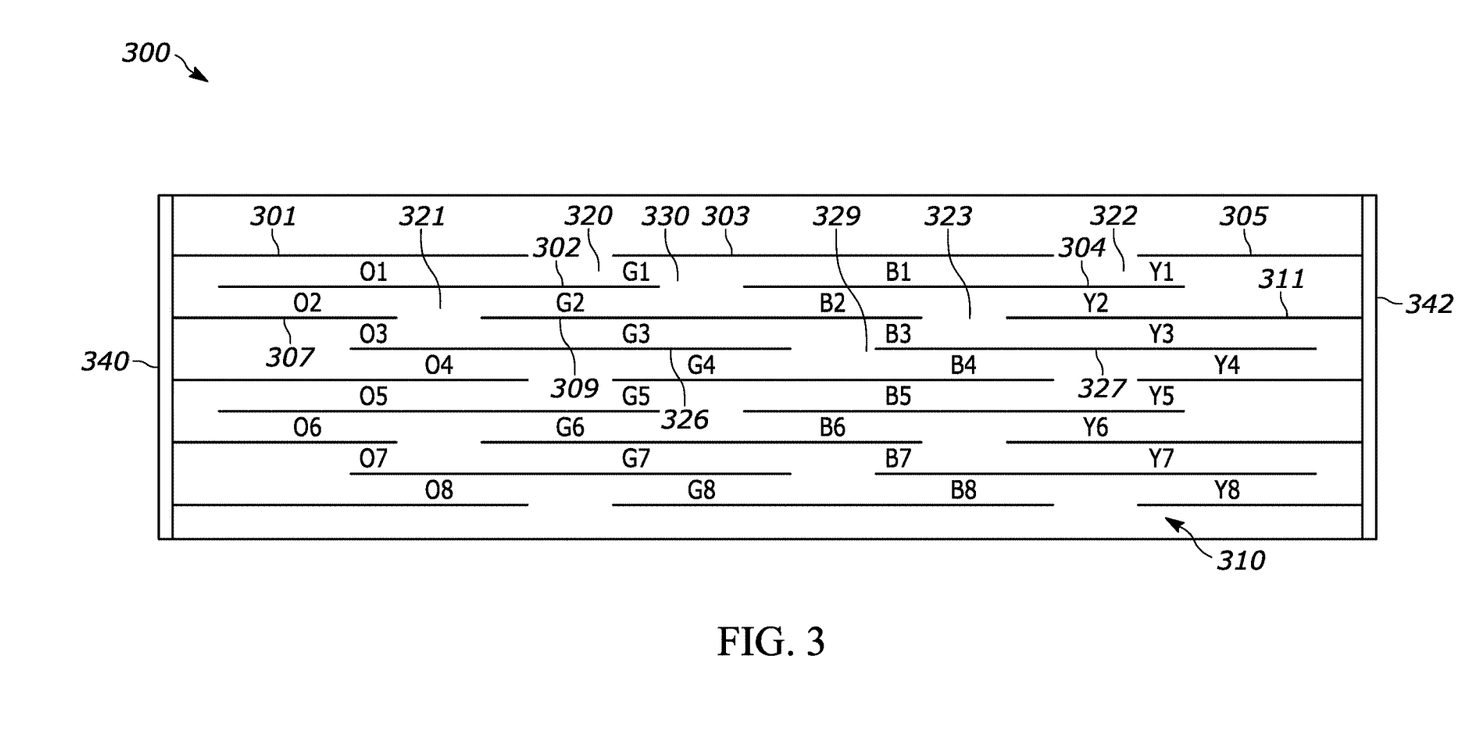
FIG. 3 is a schematic sectional view of a multilayer electrical component comprising multiple capacitive layers each having four series capacitors.

In the multilayer electrical component 300 of FIG. 3, a first capacitive layer comprises a first parallel plate electrode separated from a second parallel plate electrode by a portion of the dielectric body 310. The first parallel plate electrode comprises three electrically isolated plate portions and the second parallel plate electrode comprising two electrically isolated plate portions. A first plate portion 302 of the second parallel plate electrode overlaps first and second plate portions 301, 303 of the first parallel plate electrode. A second plate portion 304 of the second parallel plate electrode overlaps second and third plate portions 303, 305 of the first parallel plate electrode forming a first series of capacitors $O_1$, $G_1$, $B_1$, $Y_1$ separated by gaps between plate portions of the first and second parallel plate electrodes. A second capacitive layer comprises a third parallel plate electrode separated from the second parallel plate electrode by a portion of the dielectric body. The third parallel plate electrode comprises three electrically isolated plate portions. The first plate portion 302 of the second parallel plate electrode overlaps first and second plate portions 307, 309 of the third parallel plate electrode. The second plate portion 304 of the second parallel plate electrode overlaps second and third plate portions 309, 311 of the third parallel plate electrode and the overlapping plate portions form a second series of capacitors $O_2$, $G_2$, $B_2$, $Y_2$ separated by gaps between the plate portions of the second and third parallel plate electrodes. A gap 320 separating the first and second plate portions of the first parallel plate electrode is laterally offset relative to a gap 321 separating the first and second plate portions of the third parallel plate electrode, and a gap 322 separating the second and third plate portions of the first parallel plate electrode is laterally offset relative to a gap 323 separating the second and third plate portions of the third parallel plate electrode.

More generally, the multilayer electrical component of FIG. 3 can comprise additional capacitive layers. For example, a third capacitive layer comprises a fourth parallel plate electrode separated from the third parallel plate electrode by a portion of the dielectric body. The fourth parallel plate electrode comprises two electrically isolated plate portions. A first plate portion 326 of the fourth parallel plate electrode overlaps first and second plate portions 307, 309 of the third parallel plate electrode, and a second plate portion 327 of the fourth parallel plate electrode overlaps second and third plate portions 309, 311 of the third parallel plate electrode. The overlapping plate portions of the third and fourth parallel plate electrodes form a second series of capacitors $O_3$, $G_3$, $B_3$, $Y_3$ separated by gaps between the plate portions of the third and fourth parallel plate electrodes. A gap 329 separating the first and second plate portions of the fourth parallel plate electrode is laterally offset relative to a gap 330 separating the first and second plate portions of the second parallel plate electrode.

Generally, a portion of at least some of the parallel plate electrodes is electrically connected to one or more of the first and second conductive terminations. In FIG. 2, endmost plate portions 211, 213 of the first parallel plate electrode are connected to the first and second terminations, respectively, and parallel electrode plate 214 is floating. Similarly, in FIG. 3, endmost electrodes 301, 305 of the first parallel plate electrode are connected to corresponding terminations 340, 342 and the plate portions, 302, 304 of the second parallel electrode are floating. The remaining parallel plate electrodes in FIGS. 2 and 3 follow the same patterns.

Figure 4:
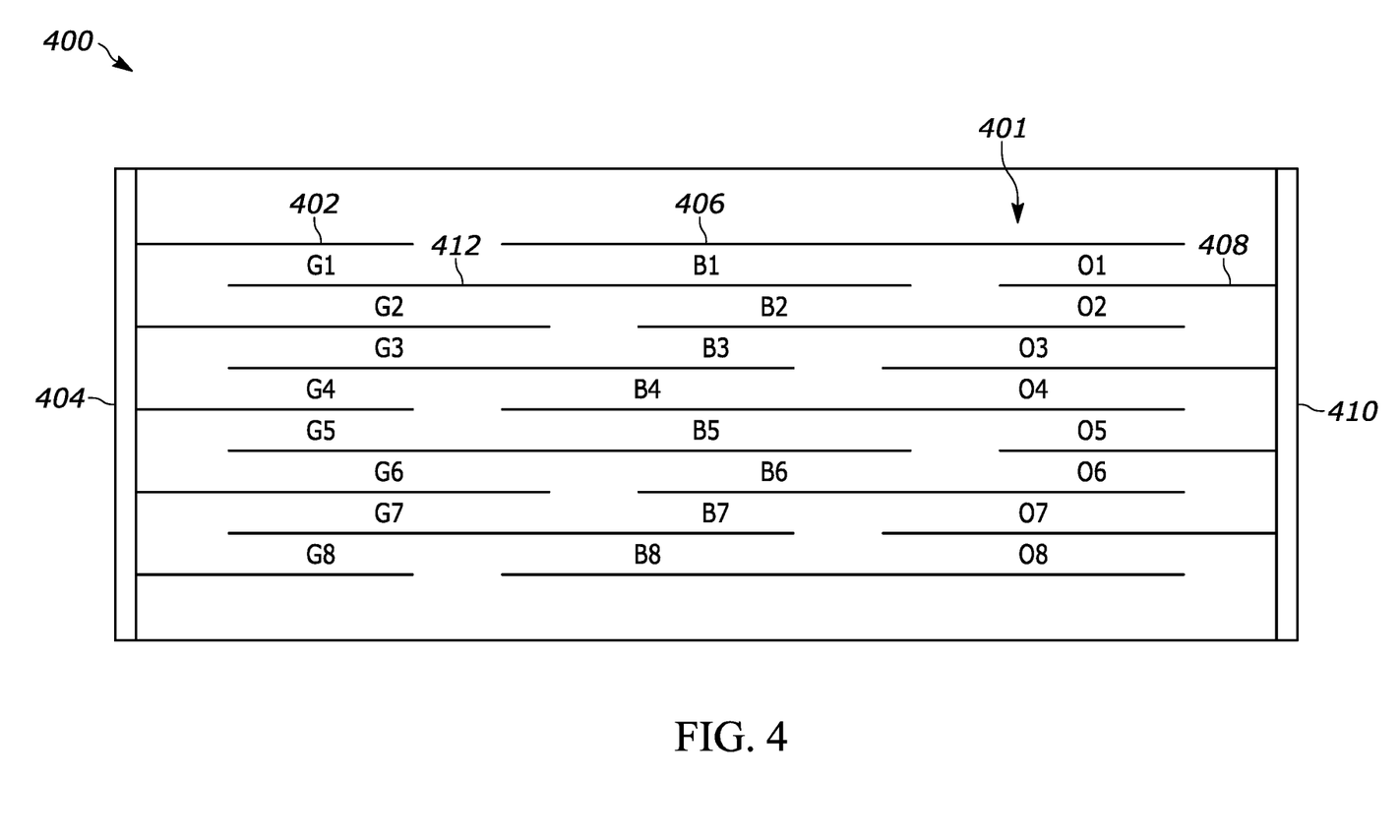
FIG. 4 is another schematic sectional view of an alternative multilayer electrical component comprising multiple capacitive layers each having three series capacitors.

In FIG. 4, the multilayer electrical component 400 comprises a plurality of parallel plate electrode embedded in a dielectric body 401. A first parallel plate electrode comprises an endmost portion 402 connected to a conductive termination 404, and a floating plate portion 406. A second parallel plate electrode comprises a first plate portion 408 connected to a termination 410, and a floating plate portion 412. Overlapping plate portions 402 and 412 form a first capacitor $G_1$, overlapping plate portions 406 and 412 form a second capacitor $B_1$, and overlapping plate portions 406 and 408 form a third capacitor $O_1$, wherein series capacitors $G_1$, $B_1$ and $O_1$ form a first capacitive layer. The remaining parallel plate electrodes in FIG. 4 each comprise corresponding plate portions wherein overlapping plate portions of adjacent parallel plate electrodes form series capacitors in capacitive layers defined by the adjacent parallel plate electrodes. As described herein, one or more gaps between plate portions defining at least two adjacent capacitive layers are offset to improve robustness of the multilayer electrical component.

In some implementations, susceptibility to stress fracture can be reduced by offsetting gaps associated with groups of adjacent capacitive layers, wherein the gaps within each group of adjacent capacitive layers are aligned. In prior art FIG. 1, for example, adjacent capacitive layers can be divided into two or more groups each comprising multiple adjacent capacitive layers having aligned gaps. According to this implementation, the aligned gaps of one group are offset relative to the aligned gaps of an adjacent group. The total capacitance of capacitive layers within each group is equivalent and the total capacitance of capacitive layers in adjacent groups is also equivalent.

The number of capacitive layers, the thickness of capacitive layers, dielectric composition, overall dimension, hulk layer, frequency with which the gaps in capacitive layers are offset, and other characteristics of the multilayer electrical component depends in part on the component specification and on use case requirements, among other considerations. Non-limiting representative capacitive layer thicknesses can be in the range 10 μm to 200 μm, typically 10 μm to 100 μm, and more typically 20 μm to 70 μm. A typical range is between 20 and 100 electrodes. But some multilayer devices can include fewer than 20 electrodes and as many as 300 or more electrodes. The thickness of the dielectric bulk layer above and below the electrode stack, if present, may be between 65 μm and 1 mm or more, and more typically between 70 μm and 150 μm. A representative multilayer electrical component can have the following dimensions: a length of at least 1 mm and typically in the range 3.2 mm to 20.5 mm or 2 to 25 ram; a width of at least 0.5 mm and typically in the range 1.6 mm to 15.5 mm or 1 mm to 20 mm; and a depth of at least 0.5 mm, typically in the range 1.6 mm and 4 mm, or up to a maximum of 5 mm, More particular dimensions for a representative multilayer electrical component are: a width of 5 mm; a length of 5.7 mm; and a thickness of 2.6 mm or 3.2 mm. The dimensions and electrode count described herein are non-limiting representative examples.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. A multilayer electrical component comprising:
   a dielectric body;
   first and second conductive terminations separated by the dielectric body;
   a plurality of parallel plate electrodes embedded in the dielectric body, the dielectric body and the plurality of parallel plate electrodes forming:
      a first capacitive layer comprising a first series of capacitors between the first conductive termination and the second conductive termination;
      a second capacitive layer, parallel to and adjacent the first capacitive layer, comprising a second series of capacitors between the first conductive termination and the second conductive termination,
      one or more capacitors of the first capacitive layer having different capacitive values than adjacent capacitors of the second capacitive layer,
      wherein a total capacitance of the first capacitive layer is equivalent to a total capacitance of the second capacitive layer;
   the first capacitive layer comprising a first parallel plate electrode separated from a second parallel plate electrode by a portion of the dielectric body, the first parallel plate electrode comprising three electrically isolated plate portions, and the second parallel plate electrode comprising two electrically isolated plate portions, a first plate portion of the second parallel plate electrode overlapping first and second plate portions of the first parallel plate electrode, and a second plate portion of the second parallel plate electrode overlapping the second and third plate portions of the first parallel plate electrode;
   the second capacitive layer comprising a third parallel plate electrode separated from the second parallel plate electrode by a portion of the dielectric body, the third parallel plate electrode comprising three electrically isolated plate portions, the first plate portion of the second parallel plate electrode overlapping first and second plate portions of the third parallel plate electrode, and the second plate portion of the second parallel plate electrode overlapping the second and third plate portions of the third parallel plate electrode; and
   wherein a gap separating the first and second plate portions of the first parallel plate electrode is laterally offset relative to a gap separating the first and second plate portions of the third parallel plate electrode, and wherein a gap separating the second and third plate portions of the first parallel plate electrode is laterally offset relative to a gap separating the second and third plate portions of the third parallel plate electrode.

2. The multilayer electrical component of claim 1, the dielectric body and the plurality of parallel plate electrodes forming:
a third capacitive layer comprising a third series of capacitors between the first conductive termination and the second conductive termination;
the second capacitive layer, parallel to and between the first capacitive layer and the third capacitive layer,
one or more capacitors of the third capacitive layer having different capacitive values than adjacent capacitors of the second capacitive layer,
wherein a total capacitance of each of the first, second and third capacitive layers are equivalent.

3. The multilayer electrical component of claim 1, individual capacitors of the first capacitive layer having the same capacitive values as individual capacitors of the second capacitive layer, wherein an order of arrangement of the first series of capacitors between the first and second conductive terminations is different than an order of arrangement of the second series of capacitors between the first and second conductive terminations.

4. The multilayer electrical component of claim 3, wherein the order of the first series of capacitors is reversed relative to the order of the second series of capacitors.

5. The multilayer electrical component of claim 1, individual capacitors of the first capacitive layer are separated by a gap, and individual capacitors of the second capacitive layer are separated by a gap, wherein one or more gaps of the first capacitive layer are laterally offset relative to one or more gaps of the second capacitive layer.

6. The multilayer electrical component of claim 1,
the first capacitive layer comprising a first parallel plate electrode separated from a second parallel plate electrode by a portion of the dielectric body, the first parallel plate electrode comprising two electrically isolated plate portions, and the second parallel plate electrode comprising a floating plate portion overlapping the two plate portions of the first parallel plate electrode, the overlapping portions of the first and second parallel plate electrodes constitute the first series of capacitors,
the second capacitive layer comprising the second parallel plate electrode separated from a third parallel plate electrode by a portion of the dielectric body, the third parallel plate electrode comprising two electrically isolated plate portions, the floating plate portion of the second parallel plate electrode overlapping the two plate portions of the third parallel plate electrode, the overlapping portions of the second and third parallel plate electrodes constitute the second series of capacitors,
wherein a gap separating the two plate portions of the first parallel plate electrode is laterally offset relative to a gap separating the two plate portions of the third parallel plate electrode.

7. The multilayer electrical component of claim 6, an endmost plate portion of at least some of the parallel plate electrodes electrically connected to the conductive terminations.

8. The multilayer electrical component of claim 1 further comprising:
a third capacitive layer comprising a fourth parallel plate electrode separated from the third parallel plate electrode by a portion of the dielectric body, the fourth parallel plate electrode comprising two electrically isolated plate portions, a first plate portion of the fourth parallel plate electrode overlapping first and second plate portions of the third parallel plate electrode, and a second plate portion of the fourth parallel plate electrode overlapping second and third plate portions of the third parallel plate electrode,
the overlapping portions of the third and fourth parallel plate electrodes constitute a third series of capacitors of the third capacitive layer,
wherein a gap separating the first and second plate portions of the fourth parallel plate electrode is laterally offset relative to a gap separating the first and second plate portions of the second parallel plate electrode.

9. The multilayer electrical component of claim 1, wherein the dielectric body comprises a ceramic material and the conductive terminations comprise a base metal or a noble metal.

10. The multilayer electrical component of claim 9 is a surface-mount capacitor.

11. A multilayer electrical component comprising:
a dielectric body;
first and second conductive terminations separated by the dielectric body;
a first series of capacitors, between the first and second conductive terminations, comprising a first parallel plate electrode separated from a second parallel plate electrode by a portion of the dielectric body, the first parallel plate electrode comprising two electrically isolated plate portions in a common plane, and the second parallel plate electrode comprising a plate portion overlapping the two plate portions of the first parallel plate electrode;
a second series of capacitors, between the first and second conductive terminations, comprising the second parallel plate electrode separated from a third parallel plate electrode by a portion of the dielectric body, the third parallel plate electrode comprising two electrically isolated plate portions in a common plane, the plate portion of the second parallel plate electrode overlapping the two plate portions of the third parallel plate electrode,
a gap separating the two plate portions of the first parallel plate electrode laterally offset relative to a gap separating the two plate portions of the third parallel plate electrode;
wherein a total capacitance of the first series of capacitors is equivalent to a total capacitance of the second series of capacitors;
the first parallel plate electrode comprising three electrically isolated plate portions, and the second parallel plate electrode comprising two electrically isolated plate portions, a first plate portion of the second parallel plate electrode overlapping first and second plate portions of the first parallel plate electrode, and a second plate portion of the second parallel plate electrode overlapping the second and third plate portions of the first parallel plate electrode;
the third parallel plate electrode comprising three electrically isolated plate portions, the first plate portion of the second parallel plate electrode overlapping first and second plate portions of the third parallel plate electrode, and the second plate portion of the second parallel plate electrode overlapping the second and third plate portions of the third parallel plate electrode; and
wherein a gap separating the first and second plate portions of the first parallel plate electrode is laterally offset relative to a gap separating the first and second plate portions of the third parallel plate electrode, and wherein a gap separating the second and third plate portions of the first parallel plate electrode is laterally offset relative to a gap separating the second and third plate portions of the third parallel plate electrode.

12. The multilayer electrical component of claim 11 further comprising:
a third series of capacitors, between the first and second conductive terminations, comprising a fourth parallel plate electrode separated from the third parallel plate electrode by a portion of the dielectric body, the fourth parallel plate electrode comprising two electrically isolated plate portions, a first plate portion of the fourth parallel plate electrode overlapping first and second plate portions of the third parallel plate electrode, and a second plate portion of the fourth parallel plate electrode overlapping second and third plate portions of the third parallel plate electrode,
wherein a gap separating the first and second plate portions of the second parallel plate electrode is laterally offset relative to a gap separating the first and second plate portions of the fourth parallel plate electrode,
wherein a total capacitance of each of the first, second and third series of capacitors are equivalent.

13. The multilayer electrical component of claim 11, wherein the dielectric body member comprises a ceramic material and the conductive terminations comprise a base metal or a noble metal.

14. The multilayer electrical component of claim 11, wherein a respective capacitor in each of the series of capacitors is formed between each of the respective overlapping plate portions of each pair of the associated parallel plate electrodes.

15. A multilayer electrical component comprising:
a dielectric body;
first and second conductive terminations separated by the dielectric body;
a plurality of parallel plate electrodes embedded in the dielectric body, the dielectric body and the plurality of parallel plate electrodes forming:
a first capacitive layer comprising a first series of capacitors between the first conductive termination and the second conductive termination;
a second capacitive layer, parallel to and adjacent the first capacitive layer, comprising a second series of capacitors between the first conductive termination and the second conductive termination,
one or more capacitors of the first capacitive layer having different capacitive values than adjacent capacitors of the second capacitive layer,
wherein a total capacitance of the first capacitive layer is equivalent to a total capacitance of the second capacitive layer;
wherein the first capacitive layer comprises a first parallel plate electrode separated from a second parallel plate electrode by a portion of the dielectric body, the first parallel plate electrode comprising three electrically isolated plate portions, and the second parallel plate electrode comprising two electrically isolated plate portions, a first plate portion of the second parallel plate electrode overlapping first and second plate portions of the first parallel plate electrode, forming a respective capacitor between each of the respective overlapping plate portions, and a second plate portion of the second parallel plate electrode overlapping the second and third plate portions of the first parallel plate electrode, forming a respective capacitor between each of the respective overlapping plate portions;
wherein the second capacitive layer comprising a third parallel plate electrode separated from the second parallel plate electrode by a portion of the dielectric body, the third parallel plate electrode comprising three electrically isolated plate portions, the first plate portion of the second parallel plate electrode overlapping first and second plate portions of the third parallel plate electrode, forming a respective capacitor between each of the respective overlapping plate portions, and the second plate portion of the second parallel plate electrode overlapping the second and third plate portions of the third parallel plate electrode, forming a respective capacitor between each of the respective overlapping plate portions; and
wherein a gap separating the first and second plate portions of the first parallel plate electrode is laterally offset relative to a gap separating the first and second plate portions of the third parallel plate electrode, and wherein a gap separating the second and third plate portions of the first parallel plate electrode is laterally offset relative to a gap separating the second and third plate portions of the third parallel plate electrode.

16. A multilayer electrical component comprising:
a dielectric body;
first and second conductive terminations separated by the dielectric body;
a first series of capacitors, between the first and second conductive terminations, comprising a first parallel plate electrode separated from a second parallel plate electrode by a portion of the dielectric body, the first parallel plate electrode comprising two electrically isolated plate portions in a common plane, and the second parallel plate electrode comprising a plate portion overlapping the two plate portions of the first parallel plate electrode;
a second series of capacitors, between the first and second conductive terminations, comprising the second parallel plate electrode separated from a third parallel plate electrode by a portion of the dielectric body, the third parallel plate electrode comprising two electrically isolated plate portions in a common plane, the plate portion of the second parallel plate electrode overlapping the two plate portions of the third parallel plate electrode,
a gap separating the two plate portions of the first parallel plate electrode laterally offset relative to a gap separating the two plate portions of the third parallel plate electrode;
a third series of capacitors, between the first and second conductive terminations, comprising a fourth parallel plate electrode separated from the third parallel plate electrode by a portion of the dielectric body, the fourth parallel plate electrode comprising two electrically isolated plate portions, a first plate portion of the fourth parallel plate electrode overlapping first and second plate portions of the third parallel plate electrode, and a second plate portion of the fourth parallel plate electrode overlapping second and a further third plate portions of the third parallel plate electrode,
wherein a gap separating the first and second plate portions of the second parallel plate electrode is laterally offset relative to a gap separating the first and second plate portions of the fourth parallel plate electrode, wherein a total capacitance of each of the first, second and third series of capacitors are equivalent.

* * * * *